US009920671B2

(12) United States Patent
Rieger et al.

(10) Patent No.: US 9,920,671 B2
(45) Date of Patent: Mar. 20, 2018

(54) AIRSTREAM TREATMENT APPARATUS (ATA) AND METHODS OF USE THEREOF

(71) Applicant: Paradigm of New York, LLC, Rochester, NY (US)

(72) Inventors: Neville F. Rieger, Pittsford, NY (US); John H. Erbland, Fairport, NY (US); James D. Blaser, Fairport, NY (US); Richard H. Scott, Canandaigua, NY (US)

(73) Assignee: Paradigm of New York, LLC, Rochester, NY (US)

( * ) Notice: Subject to any disclaimer, the term of this patent is extended or adjusted under 35 U.S.C. 154(b) by 27 days.

(21) Appl. No.: 15/042,778

(22) Filed: Feb. 12, 2016

(65) Prior Publication Data

US 2016/0158695 A1 Jun. 9, 2016

Related U.S. Application Data

(63) Continuation-in-part of application No. 14/072,577, filed on Nov. 5, 2013, now Pat. No. 9,260,998.

(Continued)

(51) Int. Cl.
*F01N 3/08* (2006.01)
*F01N 3/027* (2006.01)
(Continued)

(52) U.S. Cl.
CPC ......... *F01N 3/0892* (2013.01); *F01N 3/0275* (2013.01); *B01D 53/323* (2013.01);
(Continued)

(58) Field of Classification Search
CPC .. F01N 3/0275; F01N 3/0892; F01N 2240/04; F01N 2240/28; F01N 2470/08;
(Continued)

(56) References Cited

U.S. PATENT DOCUMENTS 3,274,753 A 9/1966 Brandt
3,856,476 A 12/1974 De Seversky
(Continued)

*Primary Examiner* — Audrey K Bradley
(74) *Attorney, Agent, or Firm* — Andrew J. Anderson, Esq.; Harter Secrest & Emery LLP

(57) ABSTRACT

An exhaust treatment apparatus (ATA) for reducing one or more components of the airstream directed through the ATA. The ATA includes an airstream inlet, an airstream outlet, and an airstream path directed through the ATA from the airstream inlet to the airstream outlet, and at least one corona/NTP generating region for altering a composition of an airstream. The ATA includes an outer enclosure forming one electrode surface and a second electrode surface positioned within and electrically insulated from the outer enclosure electrode surface, where an area between the outer enclosure electrode surface and the second electrode surface forms at least a part of the airstream path directed through the ATA. The second electrode surface includes a series of ridges directed towards the outer enclosure that encourage corona generation. A method is provided for using the ATA for treating an airstream, including an exhaust airstream from a combustion engine, as well as an exhaust airstream from a compression-ignition (diesel) engine.

19 Claims, 17 Drawing Sheets

Related U.S. Application Data

(60) Provisional application No. 61/722,404, filed on Nov. 5, 2012.

(51) Int. Cl.
 *B01D 53/32* (2006.01)
 *B01D 53/92* (2006.01)

(52) U.S. Cl.
 CPC ...... *B01D 53/925* (2013.01); *B01D 2258/012* (2013.01); *B01D 2259/818* (2013.01); *F01N 2240/04* (2013.01); *F01N 2240/28* (2013.01); *F01N 2470/08* (2013.01); *F01N 2490/06* (2013.01)

(58) Field of Classification Search
 CPC . F01N 2490/06; B01D 53/323; B01D 53/925; B01D 2258/012; B01D 2259/818
 See application file for complete search history.

(56) References Cited

U.S. PATENT DOCUMENTS

| | | | |
|---|---|---|---|
| 4,093,432 A | 6/1978 | Ahlrich | |
| 7,361,212 B2 | 4/2008 | Clark et al. | |
| 7,517,504 B2 | 4/2009 | Taylor | |
| 8,157,902 B2 | 4/2012 | Ogut et al. | |
| 2003/0168332 A1* | 9/2003 | Hall | B01D 53/22 204/166 |
| 2004/0219084 A1 | 11/2004 | Hall et al. | |
| 2006/0018812 A1 | 1/2006 | Taylor et al. | |
| 2007/0045101 A1 | 3/2007 | Ogut et al. | |
| 2008/0092533 A1 | 4/2008 | Tennison | |
| 2008/0296508 A1 | 12/2008 | Small | |
| 2009/0165439 A1* | 7/2009 | Hoshi | B01D 53/323 60/275 |
| 2009/0241775 A1 | 10/2009 | Ogut et al. | |

* cited by examiner

AIRSTREAM TREATMENT APPARATUS (ATA) AND METHODS OF USE THEREOF

CROSS REFERENCE TO RELATED APPLICATIONS

This application is a continuation-in-part of pending U.S. Ser. No. 14/072,577, which claims the benefit of U.S. Provisional Application No. 61/722,404, the disclosures of which are incorporated by reference herein in their entireties.

BACKGROUND OF THE INVENTION

The present disclosure is particularly directed to an airstream treatment apparatus (ATA) for reducing one or more components of the airstream directed through the ATA. In a preferred embodiment, the ATA comprises at least one corona/Non-Thermal Plasma (NTP) generating region where at least one component of the airstream is reduced. The present disclosure is also directed to methods of using the ATA for treating an airstream, particularly the exhaust gas airstream from a combustion engine, and more particularly the exhaust gas airstream from a compression-ignition (diesel) engine.

Internal combustion engines generate a huge amount of toxic pollution and are subject to increasingly stringent emissions standards. Thus for example, carbon monoxide (CO), nitrogen oxides ($NO_x$), sulfur dioxide ($SO_2$), non-methane hydrocarbons (NMHCs) and particulate matter (PM) are subject to stringent emissions regulations, since these compounds result in significant human and environmental damage. See, e.g., U.S. Pat. No. 8,157,902, the contents of which is incorporated herein in its entirety by reference.

In light of the strict regulation of the emissions output of internal combustion engines, a large number of pollution control mechanisms have been implemented or explored for reducing these emissions. In this regard, some systems focus on the removal of already-generated emissions (e.g., catalytic converters, Diesel Particulate Matter (DPM) filters), while others instead alter engine function to reduce the actual generation of particular emission components. Thus, for example, Exhaust Gas Recirculation (EGR) systems decrease the temperature of combustion in the engine cylinders by recirculating a proportion of the exhaust stream back into the cylinder, thereby depriving the mixture in the cylinder of oxygen as well as providing a higher heat capacity mixture. Decreased combustion temperature is highly advantageous, in that less $NO_x$ is produced at this lower temperature; however, as for all of these systems there are tradeoffs, in this case the generation of greater PM as a result of lower combustion temperature.

One emission control system that has particular promise is a Non-Thermal Plasma (NTP) system, in which corona generated by high-voltage electrical energy is used to generate "cold" plasma, that is, non-equilibrium plasma where the electrons are "hot" while the other species in the plasma are thermally "cold." Although NTPs have been shown to have numerous beneficial effects on engine emissions, these systems are very sensitive to design parameters, e.g., they work poorly if the electrode distances are too great, or if carbonaceous material (soot) accumulation causes loss of electrical power via arcing. Thus for example, U.S. Pat. No. 8,157,902 describes an NTP system for the treatment of compressive ignition (diesel) exhaust where the most significant aspect of the design is that of a very elaborately designed and constructed "self-cleaning insulator".

In light of the above, it would be highly advantageous to develop better emission control devices, and in particular corona/NTP-based emission control devices.

BRIEF SUMMARY OF THE INVENTION

The present disclosure is directed to emission control devices, and in particular corona/NTP-based emission control devices, particularly an airstream treatment apparatus (ATA) for reducing one or more components of an airstream directed through the ATA. In a preferred embodiment, the ATA comprises at least one corona/NTP generating region where at least one component of an airstream is reduced. The present disclosure is also directed to methods of using the ATA for treating an airstream, particularly the exhaust gas airstream from a combustion engine, and more particularly the exhaust gas airstream from a compression-ignition (diesel) engine.

A first embodiment of the present disclosure is directed to an Airstream Treatment Apparatus (ATA) comprising an airstream inlet, an airstream outlet, and an airstream path directed through the ATA from the airstream inlet to the airstream outlet, the ATA having at least one corona NTP generating region for altering the composition of the airstream directed through the ATA, wherein the ATA comprises an outer enclosure forming one electrode surface and a second electrode surface positioned within and electrically insulated from the outer enclosure electrode surface, where an area between the outer enclosure electrode surface and the second electrode surface forms at least a part of the airstream path directed through the ATA, and wherein the second electrode surface comprises a series of ridges positioned along the airstream path and directed towards the outer enclosure that encourage corona generation.

A second embodiment of the present disclosure is directed to the ATA of embodiment 1, where the alteration is a reduction of at least one component of the airstream directed through the ATA.

A third embodiment of the present disclosure is directed to the ATA of embodiment 2, where the airstream is the exhaust gas airstream of a combustion engine.

A fourth embodiment of the present disclosure is directed to the ATA of embodiment 3, where the combustion engine is a compressive-ignition combustion engine.

A fifth embodiment of the present disclosure is directed to the ATA of embodiment 1, where the at least one corona/NTP generating region comprises a corona cap.

A sixth embodiment of the present disclosure is directed to the ATA of embodiment 1, further comprising a corona/NTP generating bead bed.

A seventh embodiment of the present disclosure is directed to the ATA of embodiment 1, further comprising at least one gas or compound additional inlet separate from the airstream inlet.

An eighth embodiment of the present disclosure is directed to the ATA of embodiment 7, where the at least one gas or compound additional inlet is activated under computer control in response to sensed conditions.

A ninth embodiment of the present disclosure is directed to the ATA of embodiment 7, where the at least one gas or compound additional inlet is activated under computer control in response to algorithmic (lookup) conditions.

A tenth embodiment of the present invention is directed to the ATA of embodiment 1, where the series of ridges positioned along the airstream path and directed towards the outer enclosure is formed at least in part by a series of annular discs extending from a portion of the second electrode surface.

An eleventh embodiment of the present invention is directed to the ATA of embodiment 10, wherein each annular disc in the series of annular discs comprises a plurality of sharp points formed around an outer circumference of the annular disc.

A twelfth embodiment of the present invention is directed to the ATA of any one of embodiments 10-11, wherein the portion of the second electrode surface from which the series of annular discs extend is generally parallel to at least a portion of the first electrode surface.

A thirteenth embodiment of the present invention is directed to the ATA of embodiment 10, wherein there is a relatively shorter distance between the outer circumference of the annular discs and the outer enclosure than a distance between the second electrode surface and the outer enclosure downstream of the series of annular discs, such that corona generation is designed to occur primarily at outer circumference of the annular discs.

A fourteenth embodiment of the present invention is directed to the ATA of embodiment 13, further comprising guide posts extending from the outer enclosure and supporting the second electrode surface, wherein the guide posts are positioned at acute angles relative to the outer enclosure and second electrode surfaces such that the guide posts are directed away from a flux of corona generation generated between the outer circumference of the annular discs and the outer enclosure.

A fifteenth embodiment of the present invention is directed to the ATA of embodiment 10, further comprising an end cap support structure comprising a plurality of radial rib sections supporting the second electrode surface and insulating the second electrode surface from the outer enclosure.

A sixteenth embodiment of the present invention is directed to the ATA of embodiment 15, wherein the second electrode surface is in the form of a cylinder capped at an end thereof with a domed surface, and wherein the radial rib sections are shaped to receive and support the domed surface.

A seventeenth embodiment of the present invention is directed to the ATA of embodiment 15, wherein the second electrode surface is in the form of a cylindrical surface, and wherein the end cap support structure comprises a central section from which the radial rib sections extend, wherein central section is shaped to be received in an end of the second electrode cylindrical surface.

An eighteenth embodiment of the present disclosure is directed to a method for treating an airstream, comprising passing the airstream through at least one ATA of any of embodiments 1-12.

A nineteenth embodiment of the present disclosure is directed to the method of embodiment 13, where the airstream flows through more than one ATA, where the more than one ATAs are arranged in parallel.

A twentieth embodiment of the present disclosure is directed to the method of embodiment 13, where the airstream flows through more than one ATA, where the more than one ATAs are arranged serially.

A twenty first embodiment of the present disclosure is directed to the method of any one of embodiments 13-15, where the composition of the airstream is altered so as to reduce particulate matter (PM) in the airstream.

A twenty second embodiment of the present disclosure is directed to the method of embodiment 16, where the reduction in particulate matter is between 80-99% (incrementing by 1%).

A twenty third embodiment of the present disclosure is directed to the method of embodiment 17, where the reduction in particulate matter is at least 85%.

A twenty fourth embodiment of the present disclosure is directed to the method of embodiment 17, where the reduction in particulate matter is at least 95%.

An twenty fifth embodiment of the present disclosure is directed to the method of any one of embodiments 16-19, where the reduction of particulate matter is determined by gravimetric analysis.

Further specific embodiments of the present disclosure are directed towards embodiments 1-25, wherein there is more specifically a relatively shorter distance between peaks of the series of ridges positioned along the airstream path and the outer enclosure than a distance between the second electrode surface and the outer enclosure downstream of the series of ridges, such that corona generation is designed to occur primarily at peaks of the series of ridges.

BRIEF DESCRIPTION OF THE SEVERAL VIEWS OF THE DRAWING

The drawings provided in the present disclosure are provided solely to better illustrate particular embodiments of the present disclosure, and specifically do not provide an exhaustive or limiting set of embodiments of the present disclosure.

FIG. 4 further shows an airstream input of diesel engine exhaust & soot—this is a preferred but non-limiting embodiment of one application of the ATA of the present disclosure, and other airstreams are contemplated.

FIGS. 14a-14e provide bottom, side, top and cross section illustrations of the end cap support employed in FIG. 13.

FIGS. 15b and 15c provide end view illustrations of the end cap supports employed in FIG. 15a.

DETAILED DESCRIPTION OF THE INVENTION

Figure 1:
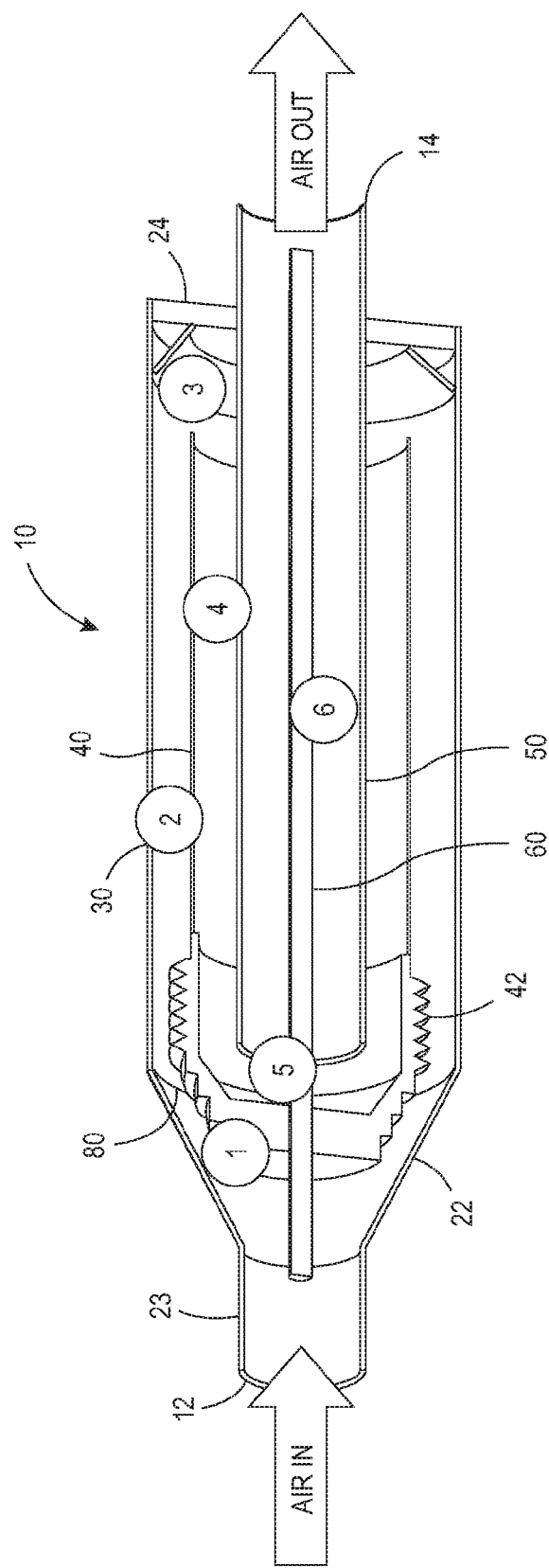
FIG. 1 provides a schematic of one embodiment of an ATA of the present disclosure. Numbered regions 1-6 indicate areas of airstream flow further detailed in FIG. 2. Dorsal surfaces of an outer can enclosure, corona sleeve and inner sleeve are indicated in the figure; the other (ventral) surfaces are unmarked in this figure.

Note that in the present disclosure, "a" or "an" are explicitly not limited to the singular form; instead, "a" and "an" are explicitly intended to be synonymous with "at least—but not limited to—one instance of" the term being referenced. Note also that, unless otherwise indicated, a range will be given as the beginning and end of the range and also the contemplated increment for the contemplated intermediate value(s) between the beginning and end of the range. Thus a phrase of the general form "a range of 5-50% (incrementing by 0.001%)" refers to a contemplated series of 5%, 5.001%, 5.002%, 5.003%, etc. (incrementing by 0.001% increments) up to the end value of 50%; a phrase of the form "less than about 5% decrementing by 0.01% decrements" refers to a contemplated series of 5%, 4.99%, 4.98%, etc. Note that "increment" and "interval" may be used synonymously, as may other synonymous usages.

Note that the present application may refer to "proximal," "distal," "dorsal" or "ventral" regions/surfaces of an ATA 10 of the present disclosure. In this regard and as shown in, e.g., FIG. 1, "proximal" refers to an area more towards an "AIR IN" end 12 of the ATA 10, with the "proximal cap" 22 being an example of a proximal component of the ATA. By contrast, "distal" refers to areas/components of the ATA 10 that are disposed towards an "AIR OUT" end 14 of the ATA, with a "distal cap" 24 being an example of such a distal component of the ATA. As FIG. 1 also shows, "dorsal" refers to areas/components of the ATA 10 disposed more to the exterior of the ATA, e.g., the "dorsal" surface of an outer can 30 is the outermost surface of the outer can enclosure. By contrast, "ventral" refers to areas/components that are disposed more to the interior of the ATA 10; for example, under this terminology the surface of an inner sleeve 50 facing a corona sleeve 40 would be the dorsal surface, whereas the surface of the inner sleeve facing a coupler electrode 60 would be the ventral surface.

The present disclosure is particularly directed to the exhaust treatment apparatus (ATA) 10 reducing one or more components of the airstream directed through the ATA. In a preferred embodiment, the ATA 10 comprises at least one corona/NTP generating region 80 where at least one component of the airstream is reduced. The present disclosure is also directed to methods of using the ATA 10 for treating an airstream, particularly the exhaust gas airstream from a combustion engine, and more particularly the exhaust gas airstream from a compression-ignition (diesel) engine.

"Airstream" as used herein refers generically to the flow of gases and materials entrained therein that the ATA 10 treats by altering a composition of the airstream. Thus, while the term "airstream" is employed generally herein for the sake of convenience, such term is not intended to be limited only to streams of ambient "air," but rather to apply to any gaseous flow to be treated for reduction of one or more component thereof by treatment with the apparatus described herein, and in more specific embodiments to more particularly include exhaust gas flows as described herein. Thus, for a compressive ignition (diesel) engine, the exhaust gas "airstream" to be treated typically comprises a mixture of ambient air (input into the engine) with various emissive components (CO, $NO_x$, $SO_2$, NMHCs, PM, etc). It is understood the "airstream" may have a different composition depending upon the location in the respective exhaust system, as shown for example in the various locations for the ATA 10 in FIG. 16. It is further understood the airstream composition being treated by the ATA is also likely different as a function of engine temperature (e.g., cold-start), engine load, altitude etc.

The term "alteration of the composition" of the airstream refers to both reductions and also possibly increases in at least one component of the airstream, where the reduction/increase is accomplished by exposure of the airstream to the ATA 10. In general the ATA 10 will reduce at least one component of the airstream—e.g., the ATA will in one embodiment reduce the amount of PM in the airstream. However, because of the complex chemical interactions between various airstream components, in some circumstances it may be advantageous to increase one component, in order that later reactions can be facilitated by that increase.

"Reduction" of at least one airstream component refers generally to the reduction of the fraction of the airstream that the component(s) represents. Thus, reduction can be measured by a variety of assays including (without limitation), % of gases, gravimetric analysis, mass component as well as volume. For some components such as PM, "reduction" may refer to the conversion of one form of the material to another, e.g., from large particles to finer particles. In this regard Applicants note that fine particulates may actually have a higher safety risk for humans than larger particulates (nanoparticles have an increased ability to penetrate deep into the lungs), however, conversion of PM to fine PM may be advantageous in situations where the fine PM is more readily treated (e.g., when the fine PM is passed back through the EGR into the engine cylinders).

The ATA 10 uses corona/NTP to treat the airstream passing through the ATA; therefore, one aspect of the present disclosure is directed to power supplies compatible with the generation of this corona/NTP. In this regard, Applicants note that power supply design will be somewhat dependent upon the airstream to be treated; for engine exhaust gas situations, for example, there will likely be particular designs useful to prevent arcing from carbonaceous material (soot) accumulation, e.g., very short power supply pulses. Generally important parameters include, for example: applied voltage; voltage polarity to the ATA 10 (corona cap 42 and electrically coupled elements positive versus negative); waveform of applied voltage (sine, square, etc.); for pulsed power (a preferred embodiment), rise time and pulse width; etc. U.S. Pat. No. 8,157,902, the disclosure of which is incorporated herein by reference, provides a number of examples of power supply output specifications that may be employed in the present disclosure, in particular for use with engine exhaust gases as the airstream.

Prophetic Example 1

Figure 2:
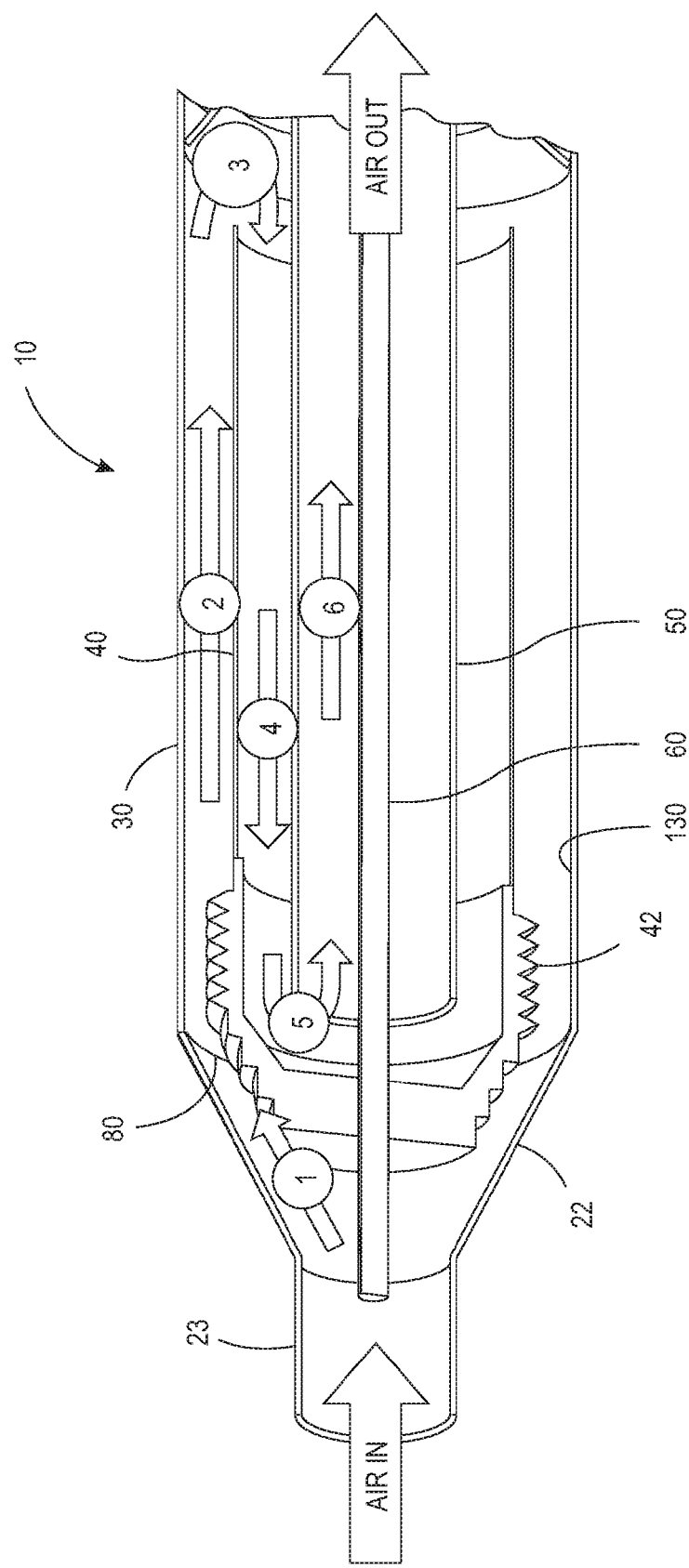
FIG. 2 provides an exploded view of the ATA of FIG. 1; in this schematic, the airstream flow for each of marked regions 1-6 is shown by the arrows. Note that only the airstream flow for the top half of the ATA is shown in this figure, and that in fact airstream flow similarly occurs for the lower (symmetric) half of the ATA left unmarked.
Figure 3:
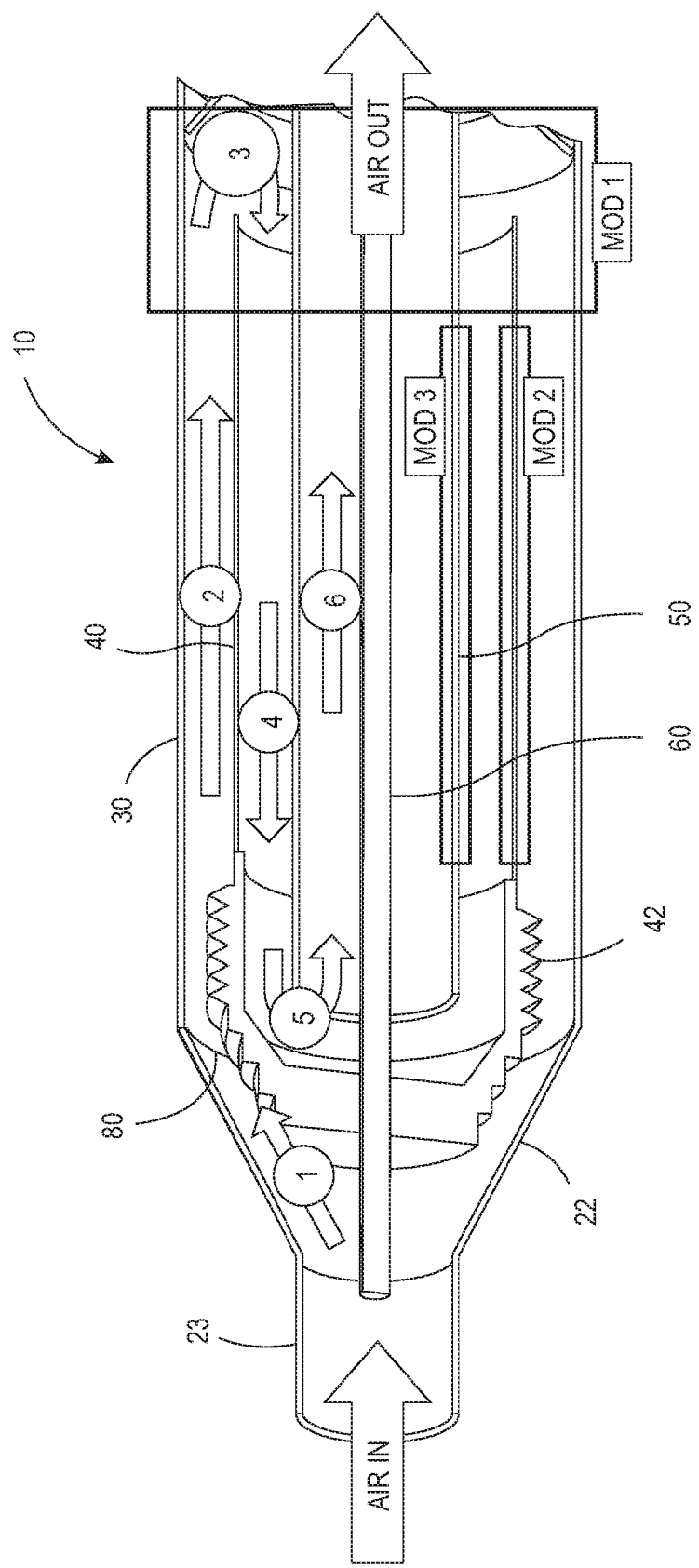
FIG. 3 provides the schematic of FIG. 2 altered to show three regions ("MOD 1" to "MOD 3") of the ATA that may be modified in various embodiments of the disclosure. Note that solely for visual clarity the "MOD 2" and "MOD 3" modifications are shown as occurring in regions that end before the most distal end of either the corona sleeve or the inner sleeve, and that in fact the present disclosure contemplates these modifications as possibly extending all the way to the distal ends of these sleeves. See, e.g., FIG. 5, which shows only a particular modification of the corona sleeve, with that modification occurring fully at the distal end of the corona sleeve ("MOD 2" in FIG. 5). Note that other modifications are contemplated for this ATA, e.g., the "MOD 4" modification in FIG. 5.
Figure 4:
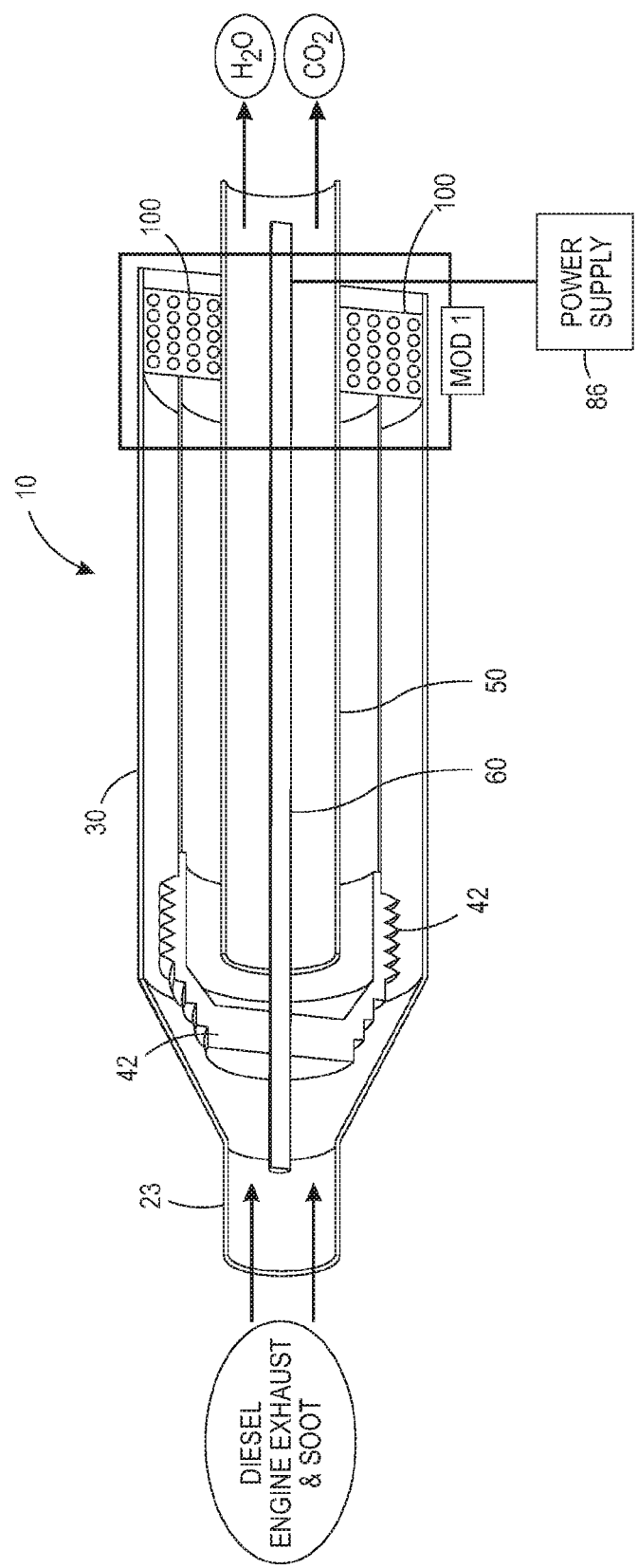
FIG. 4 provides an example of a "MOD 1" alteration to the basic ATA embodied in FIG. 1. In this embodiment, a bed of "treatment beads" is provided in the region including marked region 3 of the ATA. In this figure these treatment beads are shown in a regular array; note that this is only one (non-limiting) embodiment of the disclosure, and that non-regular arrays are also contemplated, as are a mixture of bead sizes, for example.
Figure 5:
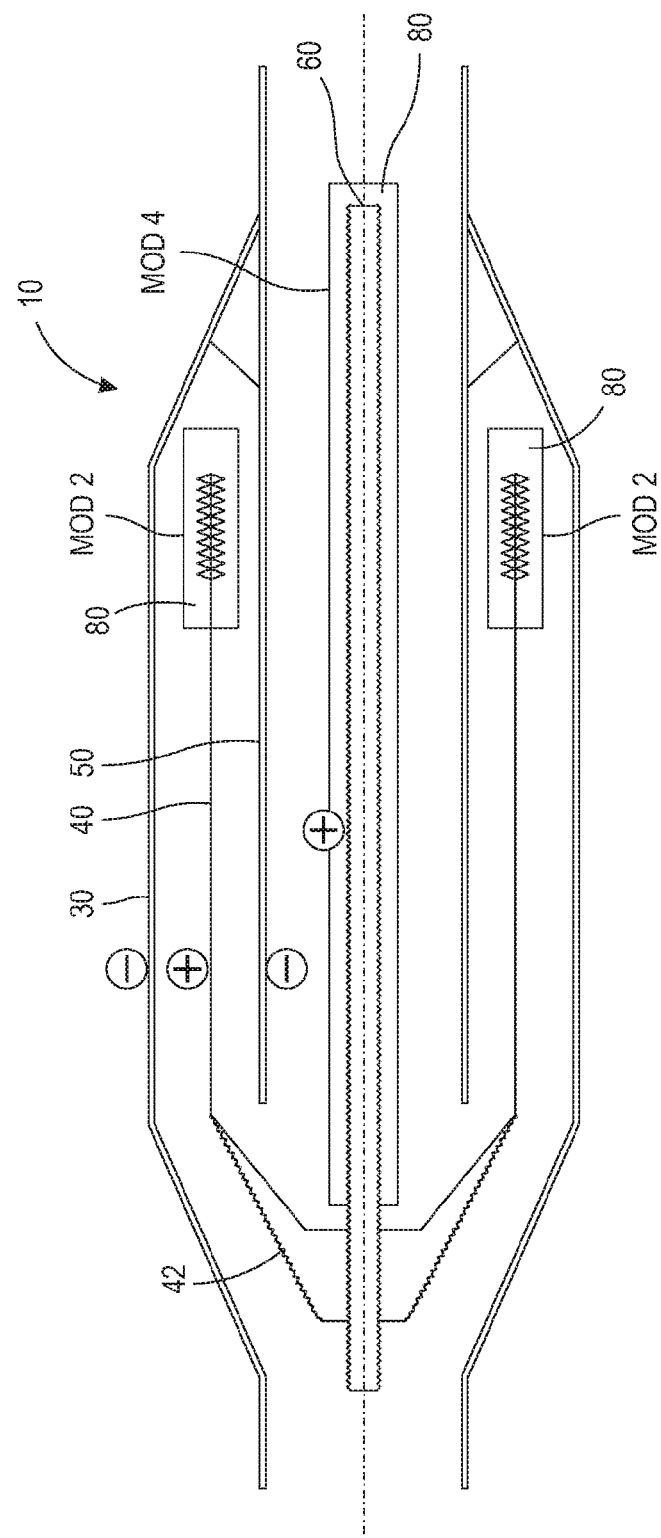
FIG. 5 provides non-limiting examples of "MOD 2" and "MOD 4" type modifications to the ATA; in these modifications corona/NTP generating combs/teeth have been added either at a distal end of the corona sleeve, along the entire length of the coupler electrode, or both of these modifications in combination.

The present disclosure is particularly directed to the ATA 10 for reducing one or more components of the airstream directed through the ATA as seen in the embodiment of FIGS. 1 and 2. Specifically, FIG. 1 and particularly the enlarged view of this embodiment as presented in FIG. 2 show the ATA 10 in which: air is introduced through a proximal adapter 23 of the ATA ("AIR IN" in the figures); flows over the corona cap 42 and immediately surrounding region (1)—between the dorsal side of the corona cap and the ventral side of the proximal cap 22; flows through region (2)—between the ventral side of the outer can 30 and a dorsal side of the corona sleeve 40; flows from region (2) through region (3)—partially bounded by the distal cap 24 and into region (4)—between a ventral side of the corona sleeve 40 and a dorsal side of the inner sleeve 50; flows through region (4); flows from region (4) through region (5)—partially bounded by the corona cap 42 and into region (6)—between a ventral side of the inner sleeve 50 and a dorsal side of the coupler electrode 60; and, flows through region (6) and through the "AIR OUT" end 14 of the ATA. Thus, in this embodiment, outer can enclosure 30 and proximal cap 22 form an outer enclosure electrode surface, and corona cap 42 and sleeve 40 form the second electrode surface, where the area between the outer enclosure electrode surface and the second electrode surface forms at least a part of the airstream path directed through the ATA. Further, the corona cap itself has a series of preferably relatively sharp ridges (at least 2 ridges, preferably at least 3 ridges, and more preferably at least 5 ridges) positioned along the airstream path and directed towards the outer enclosure that encourage corona generation. More particularly, there is a relatively shorter distance between peaks of the series of ridges positioned along the airstream path and the outer enclosure than a distance between the second electrode surface and the outer enclosure downstream of the series of ridges, such that corona generation is designed to occur primarily at peaks of the series of ridges.

Figure 6:
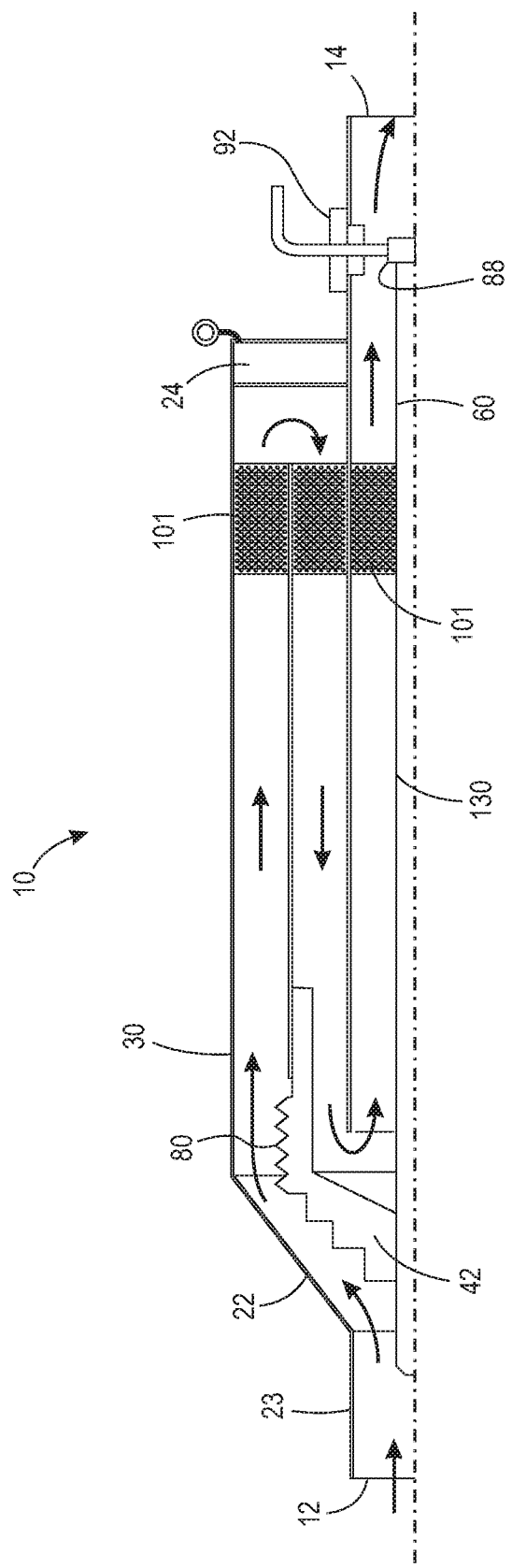
FIG. 6 provides a schematic of a "MOD 1" type embodiment of the disclosure, showing airstream flow through the upper half of the ATA, including past the connection point of the coupler electrode to the external power supply. Note that figure shows an airstream input of engine exhaust—this is a preferred but non-limiting embodiment of one application of the ATA of the present disclosure, and other airstreams are contemplated.
Figure 7:
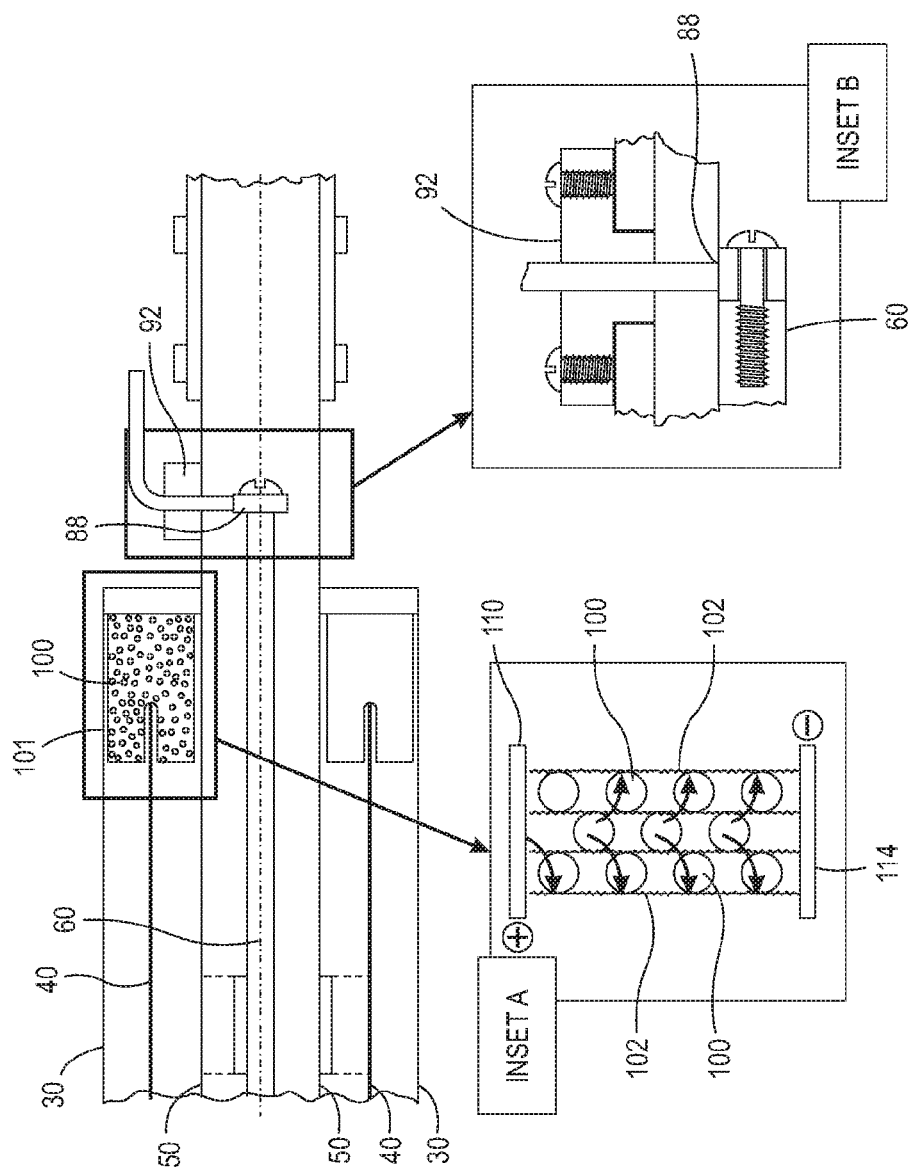
FIG. 7 provides an exploded view of the ATA shown in FIG. 6, with inset A showing one embodiment of the "treatment beads" and inset B showing one embodiment of the connection point of the coupler electrode to the external power supply.
Figure 8:
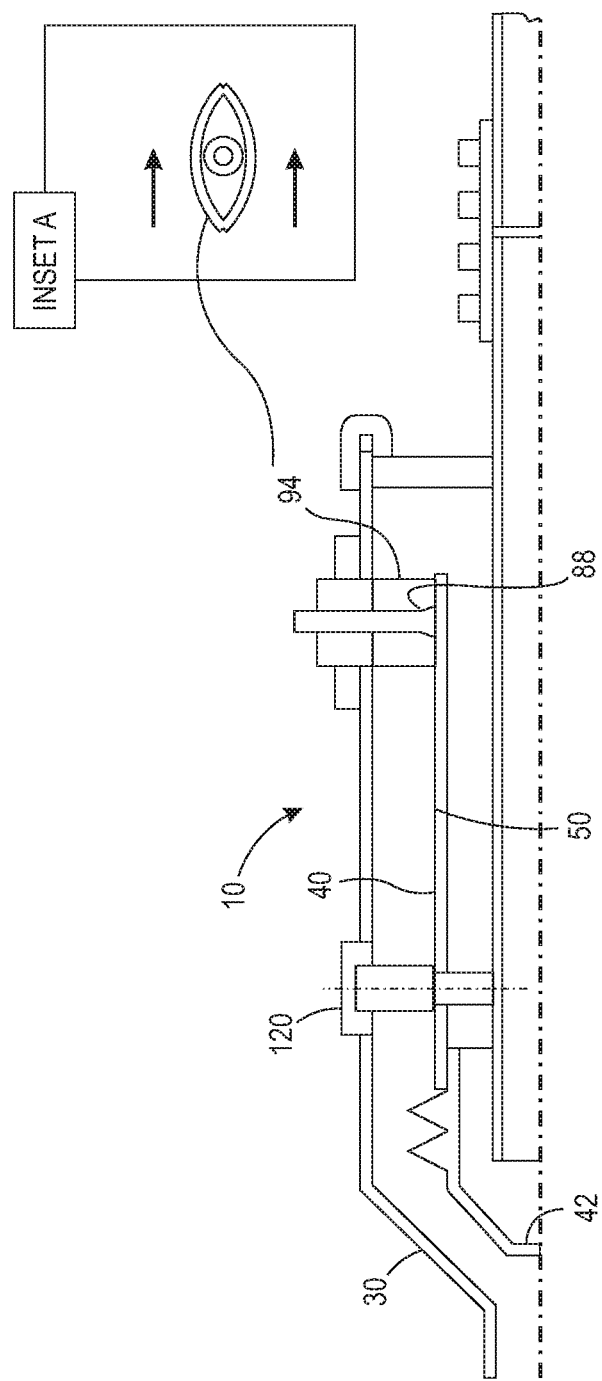
FIG. 8 provides another embodiment of the ATA of the present disclosure, where this embodiment provides a different entry point for the electrical connection to the corona cap and corona sleeve; note that in light of this alternative connection scheme, in this embodiment the coupler electrode has been eliminated as superfluous.

This embodiment has a number of features which, while non-limiting, are preferable to the ATA 10: 1) corona generation (and therefore NTP production) is designed to occur primarily at the corona cap 42, by way of the shape of the cap (i.e., with a series of ridges (a plurality of apexes or vertices extending in the direction of airstream flow) that encourage corona generation) and a relatively short distance from the peaks of the ridges of the corona cap 42 from the ventral surface of the proximal cap 22 (at least a shorter distance than between the outer can 30 and the corona sleeve 40, and between the corona sleeve and the inner sleeve 50; 2) corona generation is designed to be generally limited elsewhere in the ATA (chiefly by appropriately greater spacing of the internal components of the ATA); 3) in light of #1 and #2, extensive exposure of the airstream to NTP occurs in the region of the corona cap or shortly downstream of this region; and, 3) the connection of the ATA to an external power supply 86 is designed to minimize power loss via arcing or other electrical current flow, with this configuration including (but not limited to) location of a connection point 88 to the electrical power supply far downstream of the corona cap 42 (see, e.g., FIGS. 6-7) or shielding in combination with a streamlined flow guide (FIG. 8).

FIGS. 1 and 2 show that in this embodiment the corona cap 42 attaches to both the corona sleeve 40 and also the coupler electrode 60, where the coupler electrode serves to electrically connect the corona cap/corona sleeve assembly to the electrical power supply 86 external to the ATA 10. These figures do not show the exact configuration of the connection of the coupler electrode 60 to the external power supply 86, however FIG. 6 and FIG. 7 (particularly inset B) provide non-limiting embodiments of this connection. Note that in connection 88, the electrical input from the external power supply 86 is routed through an insulator 92 in order to reach the interior of the ATA 10 and connect to the coupler electrode 60, and that the design of this coupling is determined by the need to minimize electrical loss via non-corona generating conduction (e.g., arcing) at this point in the ATA and possibly also to provide sufficient mechanical coupling strength, e.g., as occurs when this connection point serves as the sole or primary support for the corona cap 42/corona sleeve 40/coupler electrode 60 subassembly.

Further with regard to this connection, Applicants note that in this embodiment electrical connection point 88 is positioned relatively far downstream in the ATA 10 from the point (or points in some embodiments) of corona/NTP production, in order to increase or maximize the prior exposure of the airstream to corona/NTP treatment (and thus PM reduction) prior to the airstream passing around the connection point 88.

In this regard, previous work with exhaust treatment assemblies reveals the sensitivity of this connection point 88 to electrical loss by arcing, and illustrates the lengths various workers have undertaken to prevent such loses by elaborated designs of these connections. Thus, for example in U.S. Pat. No. 8,157,902 a very specific connector design was implemented in which the insulator was thinned and provided with a variety of components in order to be "self-cleaning" of accumulated conductive particulates (carbonaceous soot) from the airstream. The present system generally seeks to avoid the need for such elaborate designs by 1) placing the connector 88 downstream of the corona/NTP treatment region (or regions) or design involving shielding in combination with a flow director 94 (FIG. 8 inset A provides a non-limiting example); 2) by designing this treatment region or regions to be as efficient at removing conductive particulates as possible; and, 3) by using different forms of corona/NTP treatment region when desirable—see e.g., the embodiments below.

Prophetic Example 2—Various "MODS" of the ATA

FIGS. 3-7 show a number of non-limiting locations where the ATA 10 provided in prophetic Example 1 above may be further modified—these non-limiting locations are given as "MOD 1," "MOD 2," "MOD 3" and "MOD 4."

FIG. 4, for example, provides an example of a "MOD 1" type modification; in this embodiment, one or more "treatment beads" 100 are inserted into region (3), including into region (3) only, as well as part of regions (2) and (4) as well as region (3) (and note that other embodiments are explicitly contemplated). The intended function of this bead 100 or bead bed 101 is to afford a site within the ATA 10 for additional exposure of the airstream to corona/NTP, where this additional exposure will act to reduce one or more components of the airstream. In one embodiment (see FIG. 7, inset A), the beads 100 are placed in a wire mesh screen 102 with sufficient transverse distance separating the beads so that clogging and flow loss of airstream through the beads is minimized. The beads 100 are supported in a positive (+) charged electrode 110 on one side and a negative (−) charged electrode 114 on the other side. Local coronas will develop at bead contact points with the wire mesh 102, further enhancing the plasma generation of this embodiment and providing additional corona/NTP treatment of the airstream passing through the bead bed 101. Although a variety of beads 100 may be used in the ATA 10, in a specific embodiment the beads may be nominally spherical (c. 1 cm diameter), and are made of a non-glazed refractory-type ceramic material. See additionally FIGS. 6-7 for other examples of the bead bed 101.

In addition to the "MOD 1" changes discussed above, other non-limiting variants of the ATA 10 may be obtained by "MOD 2"-"MOD 4" changes. FIG. 5, for example, shows various "MOD 2" and "MOD 4" modifications to the ATA; the changes shown create more sharp points for generation of corona/NTP.

Prophetic Example 3—ATA without Coupler Electrode

FIG. 8 provides a modified version of the ATA 10 in which guide posts 120 support the internal components of the ATA and electrical connectivity to the corona cap 42 and electrically connected components is obtained by a different placement of the electrical connection 88 from the external power supply 86. Since these posts 120 and electrical connector 88 provide the support/electrical connectivity functions supplied in other embodiments by the coupler electrode 60, in this embodiment the coupler electrode has been eliminated.

Applicants note that in this embodiment particular attention has been paid to the materials selection for the guide posts 120—specifically the material must be non-conductive and able to tolerate high temperatures—and to various aspects of the electrical connection, e.g., the use of a streamlined flow guide 94 (illustrated in cross-section in FIG. 8 inset A).

Prophetic Example 4—ATA with Corona Discs

The accompanying FIGS. 1-8 provide several embodiments of ATA 10 with a serpentine airstream path there through, and use of a corona cap with ridges; however, these should not be taken as a limiting set of the ATA contemplated. For example, the ATA 10 may alternatively employ a simple single direction airstream path (e.g., between the outer can 30 and corona sleeve 40, and then exiting though the distal end of the ATA), and/or other forms of ridges which encourage corona generation. FIG. 9, e.g., illustrates another embodiment of an ATA 10*a* of the present disclosure comprising outer enclosure portions 30*a* and 30*b* and proximal end cap 22*a* forming an outer enclosure forming one electrode surface, and wherein a series of annular discs 52 (at least 2 discs, preferably at least 3 discs, and more preferably at least 5 discs) extend from a portion of a second electrode surface 40*a* forming the series of ridges that encourage corona generation positioned along the airstream path and directed towards outer enclosure portion 30*b*. As shown in FIG. 9, the second electrode surface thus forms a corona sleeve in the form of a cylinder capped at both ends with domed surfaces, which are electrically connected to coupler electrode 60*a*. More particularly, there is a relatively shorter distance between the outer diameter circumference of the annular discs and the outer enclosure than a distance between the second electrode surface and the outer enclosure downstream of the series of annular discs, such that corona generation is designed to occur primarily at the outer circumference of the annular discs.

As further illustrated in FIG. 9, coupler electrode 60*a* may extend beyond the proximal end of electrode surface 40*a*, and further may include additional annular discs 52*a* extending therefrom, forming a corona cap upstream of the electrode surface 40*a*. A conical tip (not shown) may further be included at the proximal end of coupler electrode 60*a* to direct the incoming airstream over the discs 52*a*.

Coupler electrode 60*a* additionally may extend beyond the distal end of electrode surface 40*a*, forming a convenient point for electrical connection point 88*a* for an external electrical power source through insulator 92*a*. FIG. 9 further illustrates guide posts 120*a* in the form of wavy non-conductive structures, which may be advantageous to effectively increase the surface length of the guide posts, and effectively reduce carbon deposits thereon during operation of the device. Guide posts 120*a* may additionally or alternatively be streamlined similarly to flow guide 94 in FIG. 8.

Annular discs 52 and 52*a* may each further comprise a plurality of sharp points or teeth 54 (preferably at least 3 sharp points, more preferably at least 5 sharp points, and even more preferably at least 10 sharp points) as illustrated in FIG. 10 forming points with a relatively sharp angle α

(e.g., less than or equal to 90 degrees, and preferably less than or equal to 60 degrees). In one embodiment, e.g., the teeth may form 30 degree angles and extend around the outer circumference of the discs. Discs 52 may be formed of any electrically conductive material, and in various embodiments may be formed from, e.g., stainless steel or carbon steel. Discs 52 have an inner diameter (I.D.) approximately matching the outer diameter of electrode surface 40a so as to make electrical contact (and may, e.g., be welded thereto). As further illustrated in FIG. 9, the portion of the second electrode surface 40a from which the series of annular discs 52 extend may be generally parallel to at least a portion of the first electrode surface 30b. Similarly, the portion of the electrode 60a from which discs 52a extend may be generally parallel to the first electrode surface 30a.

Figure 9:
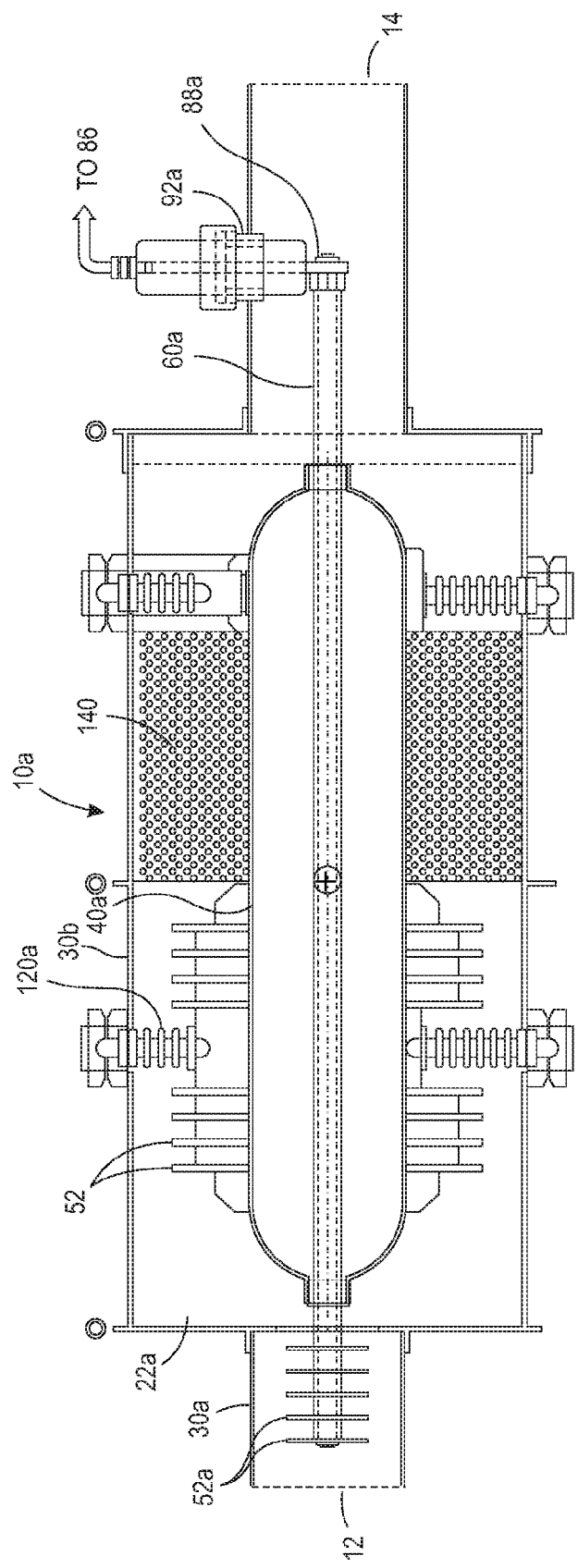
FIG. 9 provides a schematic of another embodiment of an ATA of the present disclosure, including a series of annular discs forming a series of ridges positioned along the airstream path and directed towards the outer enclosure that encourage corona generation.

Similarly as illustrated for ATA 10 in FIGS. 1-8, ATA 10a in FIG. 9 may also further include modifications such as MOD 1 to MOD 4 described above. In a further particular embodiment, FIG. 9 illustrates a treatment region 140 downstream of the discs 52, where such treatment region may comprise, e.g., an open ceramic foam where the surfaces of the open foam structure are coated with a catalytic surface on which one or more catalytic reactions may occur, with standard catalysts such as platinum, palladium, etc., being non-limiting examples. Alternatively, treatment region 140 may comprise a bed of treatment beads as described for MOD 1 above, or sections of a bed of treatment beads and of an open ceramic foam coated with a catalytic surface may be used in combination.

Figure 10:
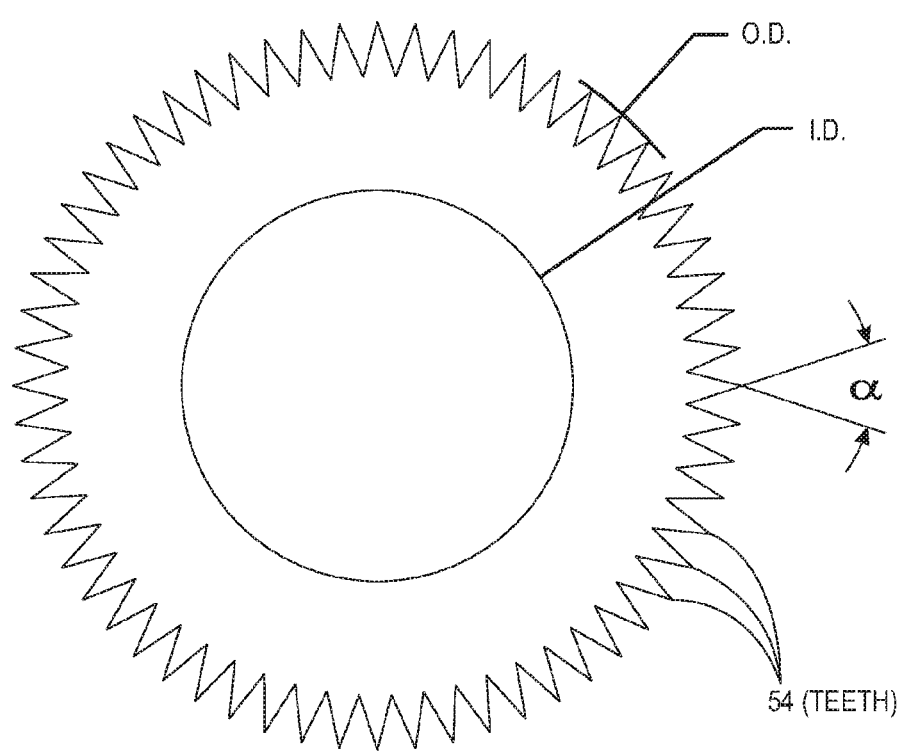
FIG. 10 provides a plane view of an annular disc as employed in the ATA of FIG. 9.
Figure 11:
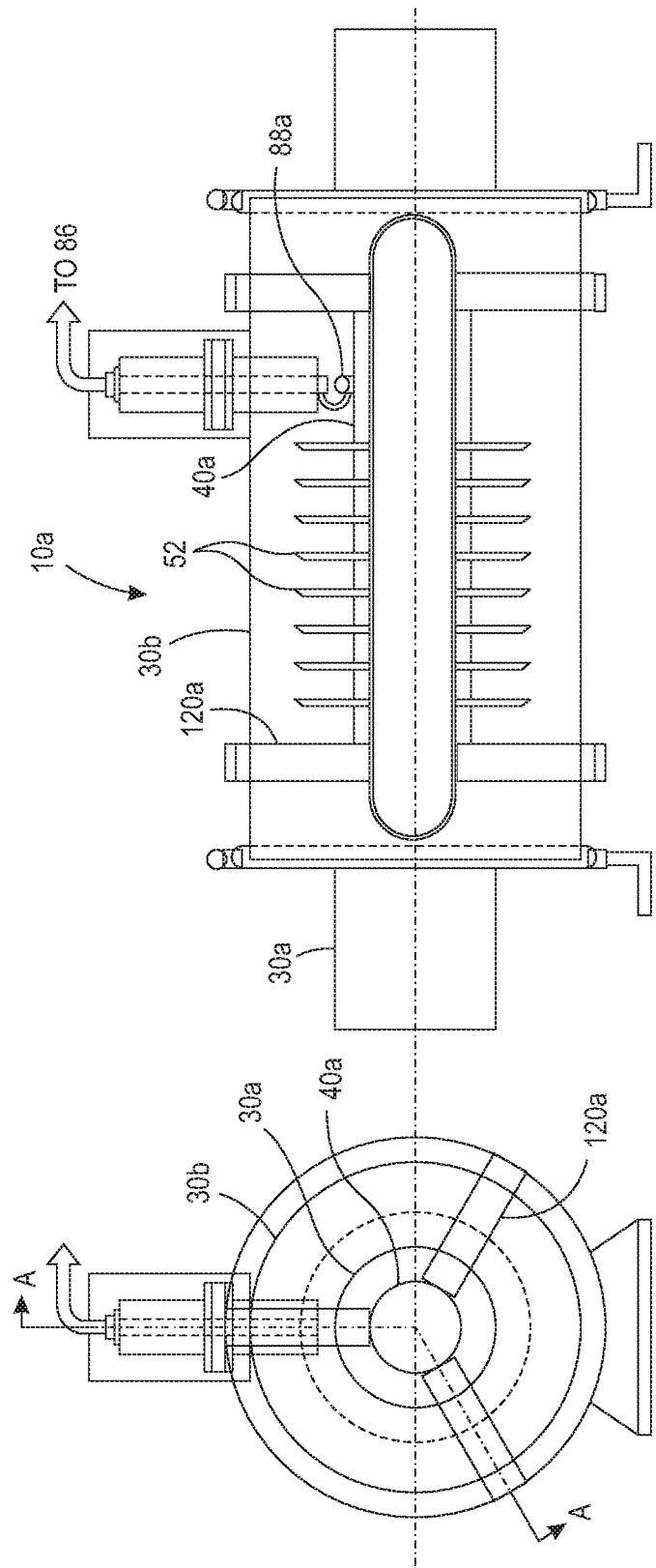
FIG. 11 provides a schematic of a modified version of an ATA of the present disclosure, including a series of annular discs forming a series of ridges positioned along the airstream path and directed towards the outer enclosure that encourage corona generation.

Similarly as shown in FIG. 8 for ATA 10, ATA 10a may be modified by removing coupler electrode 60a and instead providing an electrical connection 88a directly to electrode surface 40a as shown in FIG. 11. Similarly as shown in FIG. 8, non-conductive guide posts 120a in FIG. 10 support the internal components of the ATA and electrical connectivity to the electrode surface 40a (and electrically connected annular discs 52) is obtained by a different placement of the electrical connection 88a from the external power supply 86. Further as shown in FIG. 11, discs 52a shown in FIG. 9 may also be eliminated. FIG. 11 further shows an end view of ATA 10a, and illustrates line A-A for which the side view of ATA 10a is illustrated.

Prophetic Example 5—ATA with Corona Discs and Angled Guide Posts

Figure 12:
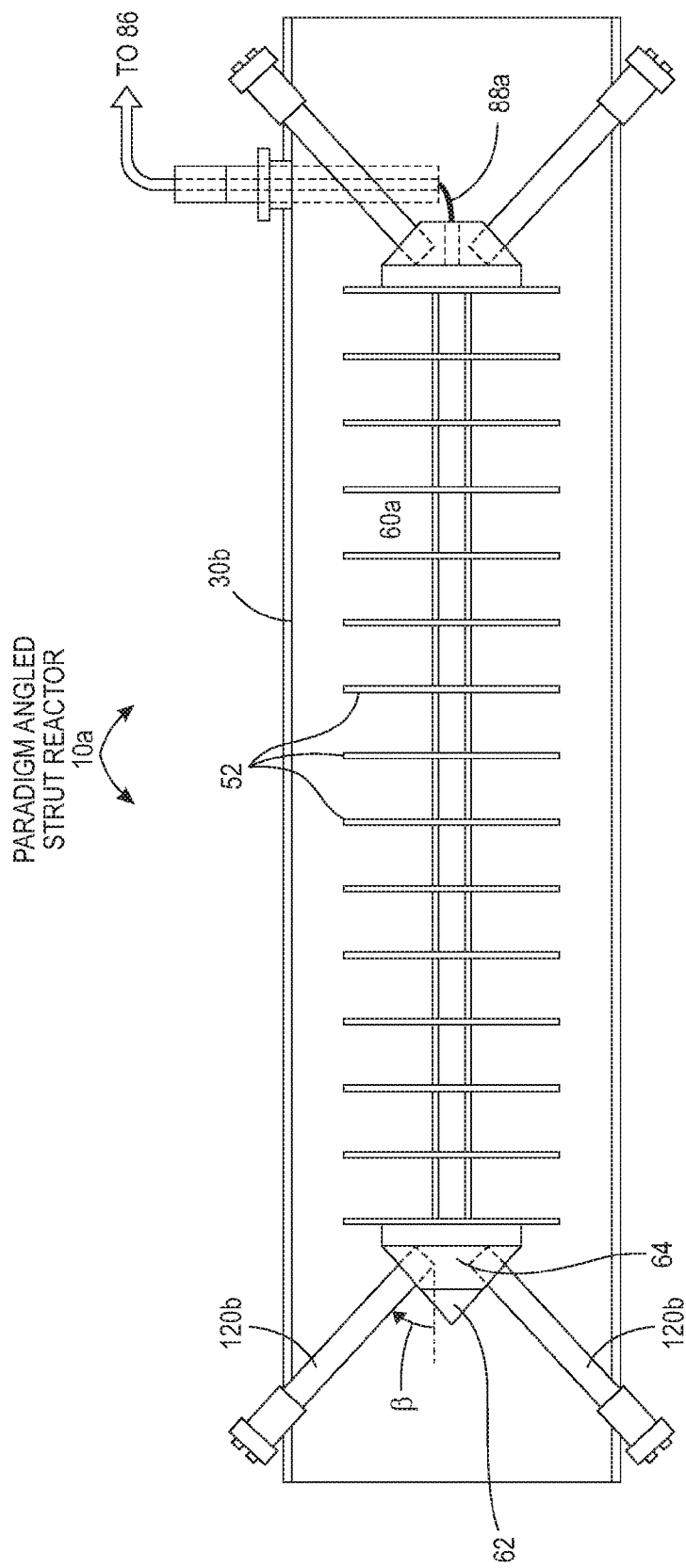
FIG. 12 provides a schematic of a modified version of an ATA of the present disclosure, including a series of annular discs forming a series of ridges positioned along the airstream path and directed towards the outer enclosure that encourage corona generation, and angled guide posts.

FIG. 12 illustrates a further embodiment of an ATA 10a of the present disclosure comprising outer enclosure portion 30b forming an outer enclosure forming of one electrode surface, and wherein a series of annular discs 52 are electrically coupled to and extend directly from electrode 60a and form the series of ridges that encourage corona generation positioned along the airstream path and directed towards outer enclosure portion 30b. In such embodiment, electrode 60a itself effectively forms a portion of a second electrode surface. Again, there is a relatively shorter distance between the outer diameter circumference of the annular discs and the outer enclosure than a distance between the second electrode surface and the outer enclosure downstream of the series of annular discs, such that corona generation is designed to occur primarily at the outer circumference of the annular discs.

In FIG. 12, guide posts 120b extend from the outer enclosure 30b and support the second electrode surface, where the guide posts are positioned at acute angles relative to the outer enclosure and second electrode surfaces such that the guide posts are directed away from a flux of corona generation generated between the outer circumference of the annular discs 52 and the outer enclosure 30b. More specifically, guide posts 120b are positioned at an angle β of less than 90 degrees (e.g., 10-80 degrees, and in a specific embodiment approximately 45 degrees) relative to the axis of the electrode 60a (which in the depicted embodiment is also parallel to outer enclosure surface 30b), such that the guide posts are directed away from the flux of the corona generation generated between the outer circumference of annular discs 52 and outer enclosure 30b. Such positioning of the guide posts outside the corona flux, as well as effectively increasing the surface length of the guide posts due to the angle, may be advantageous for effectively reducing carbon deposits thereon during operation of the device. Guide posts 120b may further be streamlined similarly to flow guide 94 in FIG. 8. FIG. 12 further illustrates conical tip 62 and guide post brace structure 64 positioned at the proximal end of coupler electrode 60a to aid in directing the incoming airstream over the discs 52.

Prophetic Example 6—ATA with Corona Discs and End Cap Supports

FIGS. 13 and 14a-14d illustrate another embodiment of an ATA 10a of the present disclosure similar to the embodiment of FIG. 9 comprising outer enclosure portions 30a and 30b and proximal end cap 22a forming an outer enclosure forming one electrode surface, and a series of annular discs 52 extending from a portion of a second electrode surface 40a forming the series of ridges that encourage corona generation positioned along the airstream path and directed towards outer enclosure portion 30b, and where the second electrode surface forms a corona sleeve in the form of a cylinder capped at both ends with domed surfaces, which are electrically connected to coupler electrode 60a.

Figure 13:
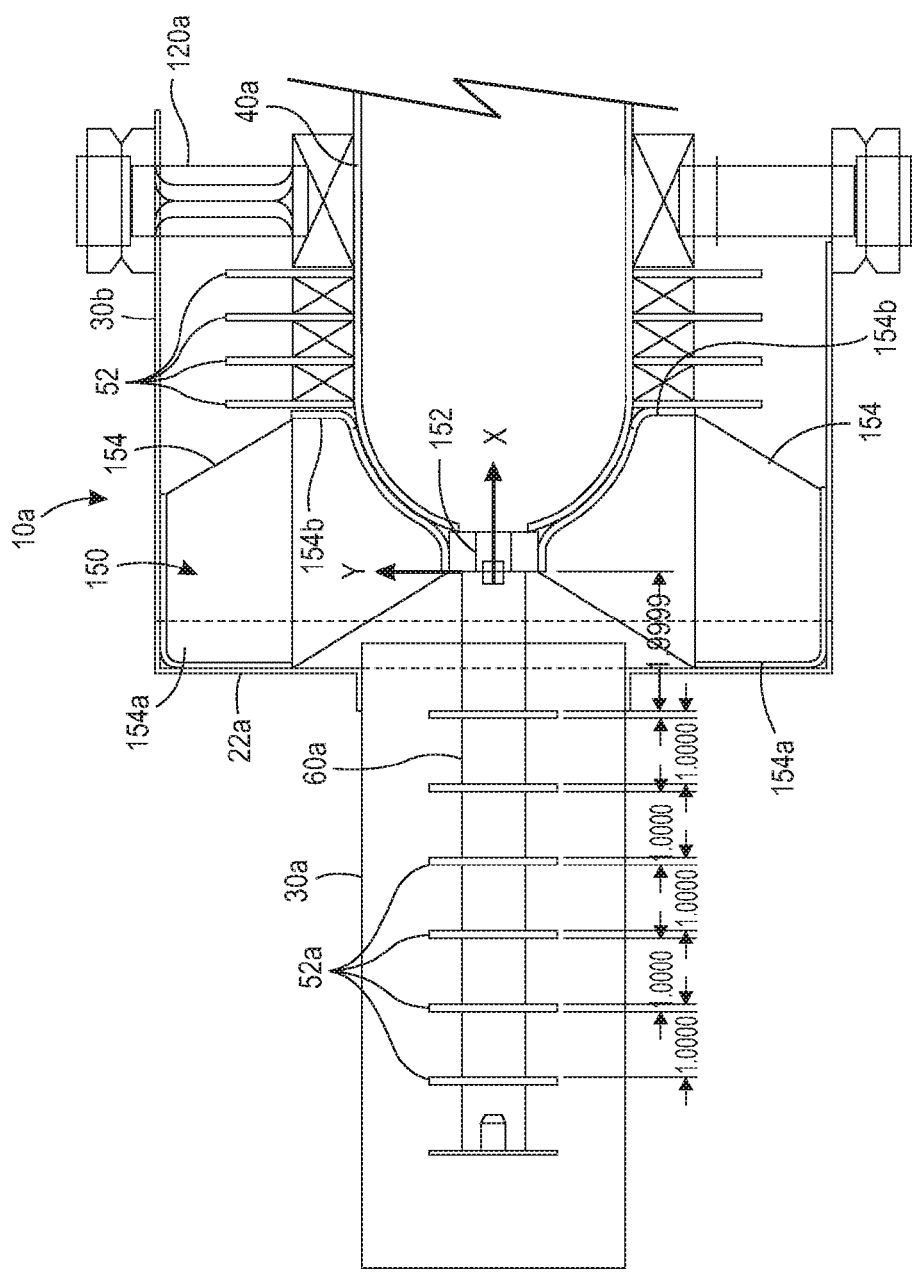
FIG. 13 provides a schematic of a modified version of an ATA of the present disclosure, including a series of annular discs forming a series of ridges positioned along the airstream path and directed towards the outer enclosure that encourage corona generation, and an end cap support.
Figure 14A:
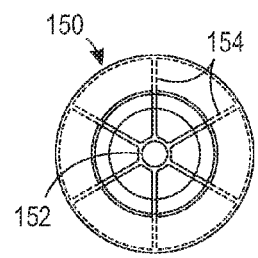
Figure 14B:
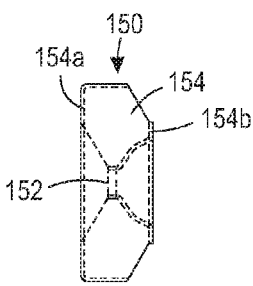
Figure 14C:
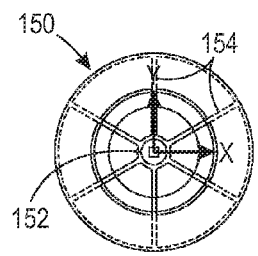
Figure 14D:
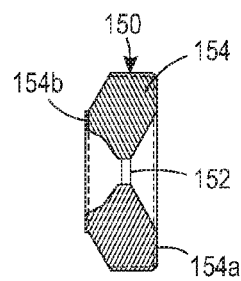

As further shown in FIGS. 13 and 14a-14d, however, this further embodiment includes an end cap support structure 150 comprising a plurality of radial rib sections supporting the second electrode surface and insulating the second electrode surface from the outer enclosure. More specifically, in this embodiment end cap support structure 150 comprises radial rib sections 154 extending from an annual ring section 152, wherein rib sections 154 are shaped to receive and support the proximal end capped domed surface of the second electrode 40a. Rib sections 154 are relatively flat and wider in the axial direction of the apparatus as shown in FIGS. 13, 14b (side view) and 14d (cross section), and relatively thinner in the views of FIGS. 14a (bottom view) and 14c (top view), so as to provide increased support while reducing impact on airflow path restrictions. Rib sections 154 are further shaped to include end 154a which abuts against proximal end cap 22a, and end 154b which abuts against a first annular disc 152. In such embodiment, end cap support structure 150 advantageously provides support for the internal components of the ATA in either a horizontal or vertical orientation of the apparatus relative to the axis of the coupler electrode 60a and cylindrical second electrode surface 40a. While FIGS. 14a-14d illustrate an end cap support structure 150 having 6 evenly spaced rib sections 154, fewer or more rib sections may be employed, with even or uneven spacing. Similarly as guide posts 120a, end cap support structures 150 may be made from a non-conductive material able to tolerate high temperatures, and in a particular embodiment may be advantageously cast from a ceramic material.

While guide posts 120a are also illustrated in FIG. 13 to provide even further support, such guide posts may alternatively be eliminated in such embodiment employing end cap support structure 150. While not shown, electrical connectivity to the second electrode surface in the embodiment of FIG. 13 may be similarly made as in the embodiments of FIG. 9 or 11.

Prophetic Example 7—ATA with Corona Discs and End Cap Supports

Figure 15A:
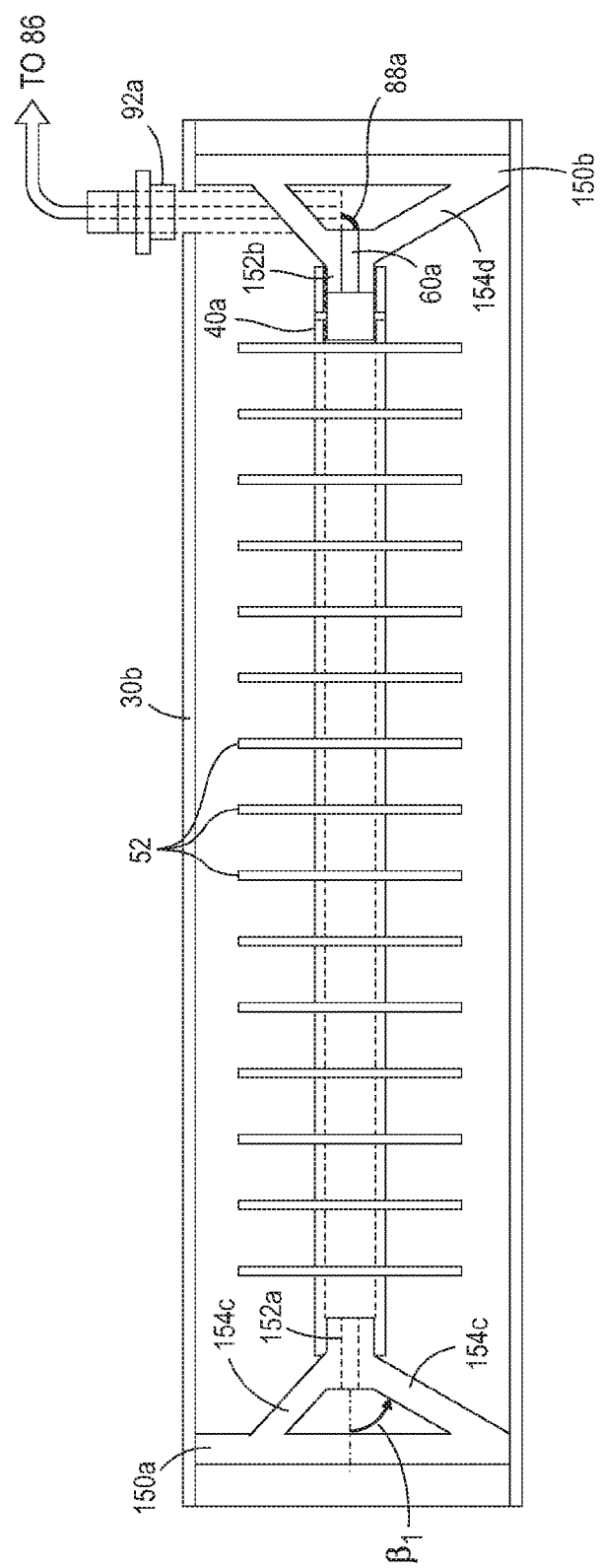
FIG. 15a provides a schematic of a further modified version of an ATA of the present disclosure, including a series of annular discs forming a series of ridges positioned along the airstream path and directed towards the outer enclosure that encourage corona generation, and end cap supports.
Figure 15B:
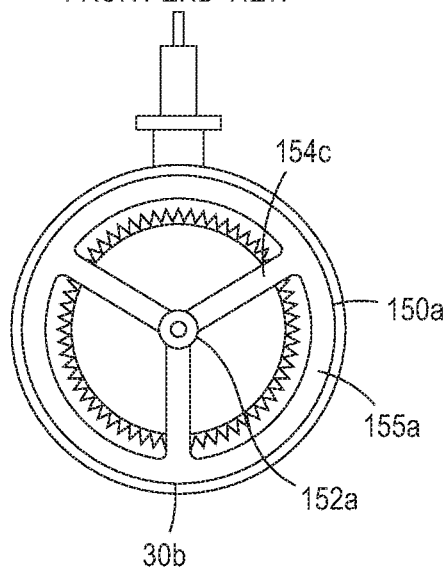
Figure 15C:
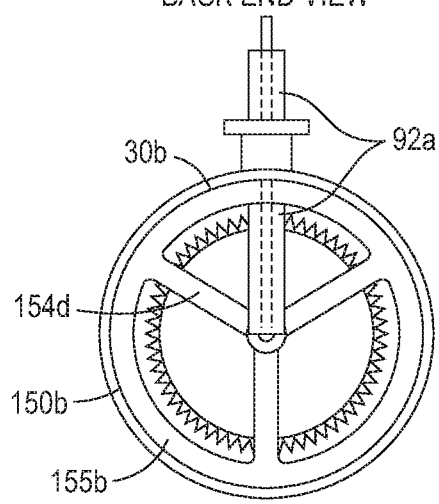

FIGS. 15*a*-15*c* illustrate a further embodiment of an ATA 10*a* of the present disclosure similar to the embodiment of FIG. 12 comprising outer enclosure portion 30*b* forming an outer enclosure forming of one electrode surface, and a series of annular discs 52 forming the series of ridges that encourage corona generation positioned along the airstream path and directed towards outer enclosure portion 30*b*. In such embodiment, electrode 60*a* is electrically coupled to cylindrical second electrode surface 40*b*, and annular discs 52 are electrically coupled to electrode surface 40*b*. Again, there is a relatively shorter distance between the outer diameter circumference of the annular discs and the outer enclosure than a distance between the second electrode surface and the outer enclosure downstream of the series of annular discs, such that corona generation is designed to occur primarily at the outer circumference of the annular discs.

In FIGS. 15*a*-15*c*, first and second end cap support structures 150*a* and 150*b* are provided comprising a plurality of radial rib sections supporting the second electrode surface and insulating the second electrode surface from the outer enclosure. More specifically, in this embodiment first end cap support structure 150*a* is provided comprising radial rib sections 154*c* extending from a central section 152*a*, wherein central section 152*a* is shaped to be received in the proximal end of cylindrical second electrode 40*b* and support the proximal end of second electrode 40*b*. A second end cap support structure 150*b* comprising radial rib sections 154*d* extending from a central section 152*b*, wherein central section 152*b* is shaped to be received in the distal end of cylindrical second electrode 40*b* and support the distal end of second electrode 40*b*. Central section 152*b* further includes a central opening to accommodate coupler electrode 60*a*. Rib sections 154*c* and 154*d* are angle away from the axis of cylindrical second electrode 40*b* at an angle $\beta_1$ of less than 90 degrees (e.g., 20-80 degrees, and in a specific embodiment approximately 60 degrees), such that the rib sections are directed away from the flux of the corona generation generated between the outer circumference of annular discs 52 and outer enclosure 30*b* (similarly as the guide posts 120*b* in FIG. 12). Such positioning of the rib sections 154*c* and 154*d* outside the corona flux, as well as effectively increasing the surface length of the rib sections due to the angle, may be advantageous for effectively reducing carbon deposits thereon during operation of the device. Rib sections 154*c* and 154*d* may further be streamlined similarly to flow guide 94 in FIG. 8. Rib sections 154*c* and 154*d* terminate at outer ring sections 155*a* and 155*b*, respectively, which outer ring sections abut against outer electrode surface 30*b*. Similarly as for the embodiment of FIG. 13, in the embodiment of FIGS. 15*a*-15*b* end cap support structures 150*a* and 150*b* advantageously provides support for the internal components of the ATA in either a horizontal or vertical orientation of the apparatus relative to the axis of the cylindrical second electrode surface 40*a*, and enable guide posts 120, 120*a* as employed in the other embodiments to be eliminated. Similarly as guide posts 120*a* and end cap support structures 150, end cap support structures 150*a* and 150*b* may be made from a non-conductive material able to tolerate high temperatures, and in a particular embodiment may be advantageously cast from a ceramic material. FIG. 15*a* further illustrates insulator 92*a* and electrical connection 88*a* which may be employed similarly as in the embodiment of FIG. 9.

Prophetic Example 8—ATA with Additional Inlets/Plumbing

The accompanying figures provide several embodiments of ATA 10 and 10*a*; however, these should not be taken as a limiting set of the ATA contemplated. For example, the ATA 10 and 10*a* may additionally include at least one catalytic surface 130 on which one or more catalytic reactions may occur, with standard catalysts such as platinum, palladium, etc., being non-limiting examples of this at least one catalytic surface.

In another embodiment, the ATA 10 and 10*a* may include one or more compound inlets for introducing one or more compound into the ATA, thereby altering ATA function. For example it may be advantageous in some situations to modify the ATA 10 or 10*a* to have a separate inlet(s) for ambient air, in order that more oxygen be available in the airstream for (e.g.) ozone generation. Other compounds apart from or in addition to ambient air may also or alternatively be introduced in order to obtain altered ATA behavior, for example recirculated exhaust gas (in the case of an ATA used to treat the airstream of a combustion engine), pure gas (e.g., pure oxygen or other gas), aerosolized or otherwise dispersed organic compound, etc. This introduction may be continuous, or it may be regulated, e.g., by way of a control valve or valves (not shown). Thus, in such an embodiment the ATA 10 and 10*a* may be altered in response to changing conditions of the exhaust stream to form a "smart" ATA, i.e., an ATA with a function that is varied in real-time to provide a different treatment function for the airstream passing through it.

Prophetic Example 9—Methods Involving the ATA: "Dumb" and "Smart" ATAs

The ATA as described herein is particularly directed to airstream treatment, particularly airstream treatment to reduce one or more components of the airstream directed through the ATA.

Figure 16:
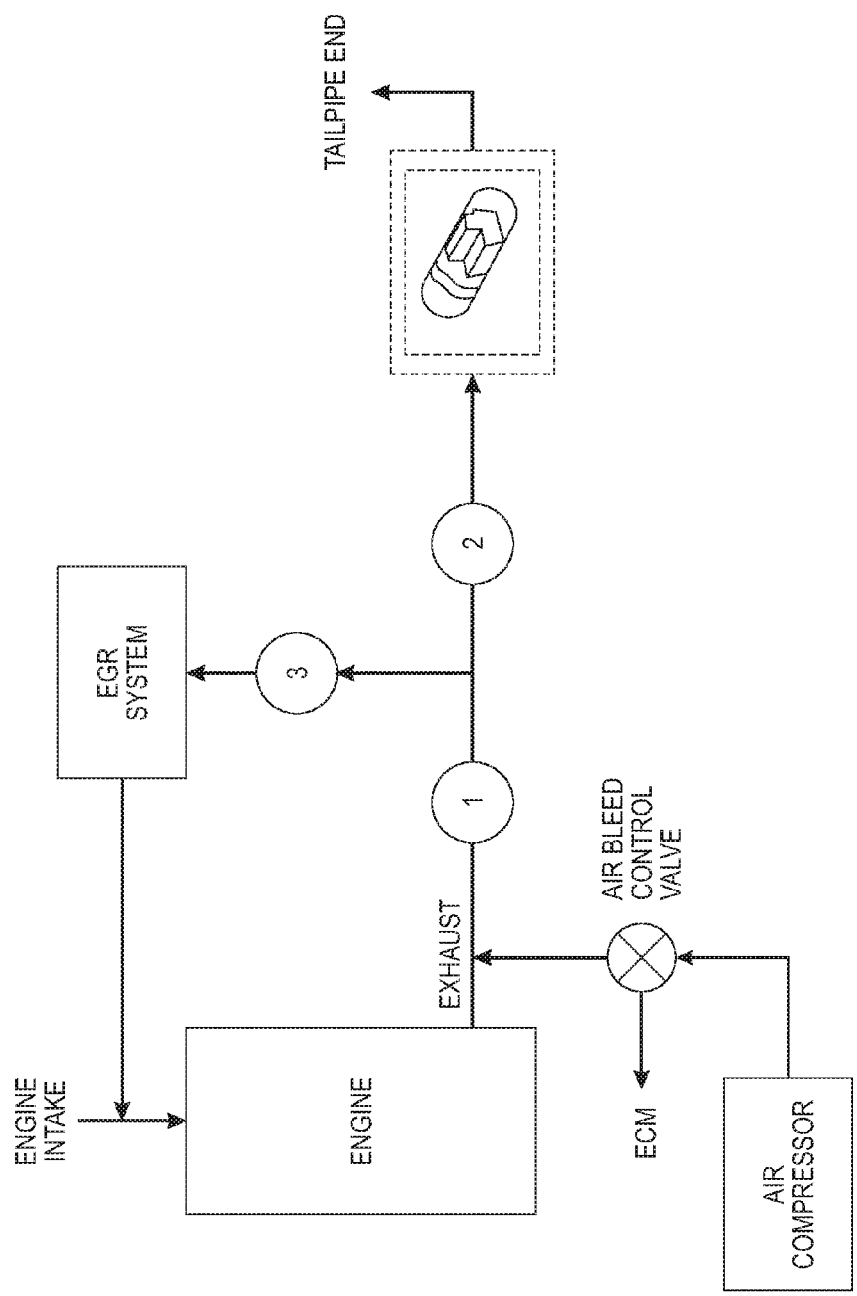
FIG. 16 provides a schematic showing three exemplary locations for the ATA of the present disclosure: upstream of the tap for the EGR loop (when present) (1); downstream of the EGR tap and upstream of a diesel particulate filter (DPF), if present (2); and, within the EGR loop (3). Thus, pursuant to this schematic, the combination of more than one ATA can be employed, as set forth below.

In this regard, the ATA as described herein is particularly applicable to the treatment of combustion engine exhaust gas airstreams, e.g., the exhaust gas stream from a gasoline or most particularly a diesel compressive-ignition engine. FIG. 16 shows a number of points in a modern diesel engine exhaust system where one or more ATAs may be integrated in order to accomplish treatment of the exhaust airstream. Additional examples of such configurations explicitly contemplated herein may be found in U.S. Pat. No. 8,157,902.

Applicants note that the one or more ATAs as described herein integrated into the exhaust stream may include both "dumb" and "smart" ATAs. Specifically, a "dumb" ATA as described herein is an ATA which does not have any mechanisms for changing/tuning its operation based on changing airstream composition or on external trigger conditions; by contrast, a "smart" ATA as described herein does have mechanisms for changing/tuning its operation in response to such composition or trigger conditions.

Thus, for example, it may be advantageous to have an ATA as described herein (or more than one ATA) which increases its corona/NTP generation when PM in the airstream increases, a situation that is common on cold startup of the engine or on heavy engine loading (i.e., going from a flat road to a hill). In one embodiment, the ATA as described herein may accomplish such increased corona/NTP generation by design of the power supply 86 or by design of its internal components.

In other designs, the ATA as described herein may accomplish treatment of such excess PM by sensing such an increase and gating in more ambient air or even stored gases (see Prophetic Example 8); this sensing/gating may be accomplished by internal (mechanical) ATA mechanisms or it may be under external computer control, e.g., controlled via one of the onboard computer control mechanisms that are integral to modern diesel and gasoline engines. These examples are non-limiting, and Applicants expressly contemplate other such systems.

Applicants also note that the present disclosure also explicitly contemplates "serial" configurations of one or more ATAs as described herein, in which the "AIR OUT" of the first ATA is connected to the "AIR IN" of the second ATA, etc. The present disclosure also encompasses "parallel" arrangements in which an airstream is split into multiple flows by a splitter manifold, and each of the multiple flows is then directed through an ATA as described herein, one for each flow.

The following embodiments provide a non-limiting list of some of the embodiments of the present disclosure. Other embodiments are presented elsewhere herein.

What is claimed is:

1. An Airstream Treatment Apparatus (ATA) comprising
an airstream inlet,
an airstream outlet, and
an airstream path directed through the ATA from the airstream inlet to the airstream outlet,
the ATA having at least one corona NTP generating region for altering a composition of an airstream passing through the ATA,
wherein the ATA comprises an outer enclosure forming an outer enclosure electrode surface and a second electrode surface positioned within and electrically insulated from the outer enclosure electrode surface,
wherein an area between the outer enclosure electrode surface and the second electrode surface forms at least a part of the airstream path directed through the ATA, and
wherein the second electrode surface comprises a series of ridges positioned along the airstream path and directed towards the outer enclosure that encourage corona generation,
wherein the series of ridges positioned along the airstream path and directed towards the outer enclosure is formed at least in part by a series of annular discs extending from a portion of the second electrode surface, and
wherein each annular disc in the series of annular discs comprises a plurality of sharp points formed around an outer circumference of the annular disc.

2. The ATA of claim 1, where the at least one corona NTP generating region comprises a corona cap.

3. The ATA of claim 1, further comprising a corona NTP generating bead bed.

4. The ATA of claim 1, wherein the portion of the second electrode surface from which the series of annular discs extend is generally parallel to at least a portion of the outer enclosure electrode surface.

5. The ATA of claim 1, wherein there is a relatively shorter distance between an outer circumference of the annular discs and the outer enclosure than a distance between the second electrode surface and the outer enclosure downstream of the series of annular discs, such that corona generation is designed to occur primarily at the outer circumference of the annular discs.

6. The ATA of claim 1, wherein there is a relatively shorter distance between peaks of the series of ridges positioned along the airstream path and the outer enclosure than a distance between the second electrode surface and the outer enclosure downstream of the series of ridges, such that corona generation is designed to occur primarily at peaks of the series of ridges.

7. The ATA of claim 1, wherein the altering the composition is a reduction of at least one component of the airstream.

8. The ATA of claim 7, where the airstream is an exhaust gas airstream of a combustion engine.

9. The ATA of claim 8, where the combustion engine is a compressive-ignition combustion engine.

10. The ATA of claim 1, further comprising an end cap support structure comprising a plurality of radial rib sections supporting the second electrode surface and insulating the second electrode surface from the outer enclosure.

11. The ATA of claim 10, wherein the second electrode surface is in the form of a cylinder capped at an end thereof with a domed surface, and wherein the radial rib sections are shaped to receive and support the domed surface.

12. The ATA of claim 10, wherein the second electrode surface is in the form of a cylindrical surface, and wherein the end cap support structure comprises a central section from which the radial rib sections extend, wherein central section is shaped to be received in an end of the second electrode cylindrical surface.

13. A method for treating an airstream, comprising passing the airstream through at least one ATA of claim 1.

14. The method of claim 13, where the airstream flows through more than one ATA, wherein the more than one ATAs are arranged in parallel.

15. The method of claim 13, where the airstream flows through more than one ATA, wherein the more than one ATAs are arranged serially.

16. The method of claim 13, where the composition of the airstream is altered so as to reduce particulate matter (PM) in the airstream.

17. The method of claim 16, where the reduction in particulate matter is between 80% to 99% as determined by gravimetric analysis.

18. An Airstream Treatment Apparatus (ATA) comprising
an airstream inlet,
an airstream outlet, and
an airstream path directed through the ATA from the airstream inlet to the airstream outlet,
the ATA having at least one corona NTP generating region for altering a composition of an airstream passing through the ATA,
wherein the ATA comprises an outer enclosure forming an outer enclosure electrode surface and a second electrode surface positioned within and electrically insulated from the outer enclosure electrode surface,
wherein an area between the outer enclosure electrode surface and the second electrode surface forms at least a part of the airstream path directed through the ATA, and
wherein the second electrode surface comprises a series of ridges positioned along the airstream path and directed towards the outer enclosure that encourage corona generation, wherein the series of ridges positioned along the airstream path and directed towards the outer enclosure is formed at least in part by a series of annular discs extending from a portion of the second electrode surface, wherein there is a relatively shorter distance between an outer circumference of the annular discs and the outer enclosure than a distance between the second electrode surface and the outer enclosure downstream of the series of annular discs, such that corona generation is designed to occur primarily at the outer circumference of the annular discs, and further comprising guide posts extending from the outer enclosure and supporting the second electrode surface, wherein the guide posts are positioned at acute angles relative to the outer enclosure and second electrode surfaces such that the guide posts are directed away from a flux of corona generation generated between the outer circumference of the annular discs and the outer enclosure.

19. The ATA of claim 18, wherein each annular disc in the series of annular discs comprises a plurality of sharp points formed around an outer circumference of the annular disc.

\* \* \* \* \*